(12) United States Patent
Kuo et al.

(10) Patent No.: US 8,925,227 B2
(45) Date of Patent: Jan. 6, 2015

(54) DISPLAY BACKPLANE AND LCD DEVICE

(75) Inventors: Yi-cheng Kuo, Guandong (CN);
Yu-chun Hsiao, Guandong (CN);
Chengwen Que, Guandong (CN);
Pangling Zhang, Guandong (CN);
Dehua Li, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 176 days.

(21) Appl. No.: 13/634,872

(22) PCT Filed: Aug. 9, 2012

(86) PCT No.: PCT/CN2012/079893
§ 371 (c)(1),
(2), (4) Date: Sep. 13, 2012

(87) PCT Pub. No.: WO2014/023006
PCT Pub. Date: Feb. 13, 2014

(65) Prior Publication Data
US 2014/0043793 A1    Feb. 13, 2014

(30) Foreign Application Priority Data
Aug. 7, 2012 (CN) .......................... 2012 1 0278610

(51) Int. Cl.
*G09F 1/12* (2006.01)
*A47G 1/20* (2006.01)

(52) U.S. Cl.
CPC ... *G09F 1/12* (2013.01); *A47G 1/20* (2013.01)
USPC ................... 40/780; 40/209; 40/739; 40/730; 40/782; 403/353; 403/60; 403/82; 403/116; 403/252; 403/255; 403/331; 403/13; 403/14; 403/382; 403/403; 5/201; 248/489

(58) Field of Classification Search
CPC ............... G09F 1/12; A47G 1/16; A47G 1/20
USPC ............ 40/780, 209, 739, 730, 782; 403/353, 403/60, 82, 116, 252, 255, 331, 13, 14, 382, 403/403; 5/201; 248/489
See application file for complete search history.

(56) References Cited

U.S. PATENT DOCUMENTS

| | | | | |
|---|---|---|---|---|
| 3,713,181 A | * | 1/1973 | Hougland | 5/176.1 |
| 4,006,836 A | * | 2/1977 | Micallef | 215/218 |
| 4,592,672 A | * | 6/1986 | Ruch, Jr. | 403/205 |
| 2010/0276562 A1 | * | 11/2010 | Nguyen | 248/488 |

* cited by examiner

*Primary Examiner* — Syed A Islam
(74) *Attorney, Agent, or Firm* — Andrew C. Cheng

(57) ABSTRACT

The present invention discloses a display backplane and an LCD device. The display backplane comprises multiple supporting brackets and a connecting slot, wherein, the connecting slot comprises a sliding slot and a protruding platform, and the protruding platform is sliding held in the sliding slot, and at least two of the brackets can rotate relatively about a first rotation axis perpendicular to the plane of the display backplane. After rotation, the display backplane formed by the brackets is smaller in volume such that it can reduce the volume occupied by the packing and shipping during transportation process of the display backplane in order to reduce the packing and shipping cost during transportation process of the display backplane.

16 Claims, 2 Drawing Sheets

DISPLAY BACKPLANE AND LCD DEVICE

BACKGROUND OF THE INVENTION

1. Field of the Invention

The present invention relates to the liquid crystal display (LCD) field, and more particularly to a display backplane and an LCD device.

2. Description of Related Art

The liquid crystal display (LCD) device comprises an LCD panel and a backlight module, wherein, the backlight module comprises optical films, a light guide plate, a backlight unit and a backplane. The backplane is the main supporting structure of the entire backlight module so as to protect the optical films, the light guide plate, and the backlight unit of the back light module, and to provide the required mechanical strength of the back light module.

In order to meet the requirement of the large-size LCD device, the backplane of the conventional art is an integral backplane. It is general made of an integral stamping process to make the volume of the backplane larger. The backplane with integral type occupies a larger volume of packing and shipping in the packing and shipping process. Therefore, the shipping cost of the product is increased.

SUMMARY OF THE INVENTION

The main technical problem solved by the present invention is to provide a retractive display backplane and an LCD using the same.

In order to solve the above-mentioned technical problem, a technical solution provided by the present invention is: a display backplane comprising:

multiple supporting brackets comprising two first supporting brackets in parallel disposition and two second supporting brackets in parallel disposition, wherein the first supporting brackets and the second supporting brackets are hinged connected in sequence to form a parallelogram frame; and a connecting slot comprising a sliding slot disposed at a terminal portion of one of the supporting brackets and a protruding platform disposed at a terminal portion of another of the supporting brackets, wherein the protruding platform is sliding held in the sliding slot, and the protruding platform and the sliding slot are disposed to allow at least two of the supporting brackets to relatively rotate about a first rotation axis perpendicular to the plane of the display backplane, and the protruding platform and the sliding slot are circular arcs, and at least two of the supporting brackets are hinged connected through the connecting slot.

Wherein, the circular-arc-shaped sliding slot comprises a first circular-arc-shaped sidewall and a second circular-arc-shaped sidewall being disposed with intervals and the central axes of the first circular-arc-shaped sidewall and the second circular-arc-shaped sidewall are on the first rotation axis, and the protruding platform comprises a third circular-arc-shaped sidewall and a fourth circular-arc-shaped sidewall being disposed with intervals and the central axes of the third circular-arc-shaped sidewall and the fourth circular-arc-shaped sidewall are on the first rotation axis, and the third circular-arc-shaped sidewall and the fourth circular-arc-shaped sidewall are sliding held between the first circular-arc-shaped sidewall and the second circular-arc-shaped sidewall.

Wherein, the first supporting brackets and the second supporting brackets are hinged connected through the connecting slot at two apex angles of the opposite corners of the parallelogram frame.

Wherein, the first supporting brackets and the second supporting brackets are hinged connected through a connecting member at the other two apex angles of the opposite corners of the parallelogram frame, and the connecting member inserts into through holes of the first supporting bracket and the second supporting bracket to allow the first supporting bracket and the second supporting bracket to rotate relatively about a second rotation axis perpendicular to the plane of the display backplane.

Wherein, intersection points defined by the first rotation axis, the second rotation axis, and the plane of the display backplane form a parallelogram.

Wherein, at four apex angles of the opposite corners of the parallelogram frame, the first supporting brackets and the second supporting brackets are all hinged connected through the connecting slots, and the intersection points defined by the first rotation axis and the plane of the display backplane at the four apex angles form a parallelogram.

Wherein, the sliding slot and the protruding platform are formed on the corresponding supporting brackets by stamping.

In order to solve the above-mentioned technical problem, another technical solution provided by the present invention is: a display backplane comprising:

multiple supporting brackets; and a connecting slot comprising a sliding slot disposed at a terminal portion of one of the supporting brackets and a protruding platform disposed at a terminal portion of another of the supporting brackets, wherein the protruding platform is sliding held in the sliding slot, and the protruding platform and the sliding slot are disposed to allow at least two of the supporting brackets to relatively rotate about a first rotation axis perpendicular to the plane of the display backplane, and the protruding platform and the sliding slot are circular arcs, and at least two of the supporting brackets are hinged connected through the connecting slot.

Wherein, the protruding platform and the sliding slot are circular arcs.

Wherein, the circular-arc-shaped sliding slot comprises a first circular-arc-shaped sidewall and a second circular-arc-shaped sidewall being disposed with intervals and the central axes of the first circular-arc-shaped sidewall and the second circular-arc-shaped sidewall are on the first rotation axis, and the protruding platform comprises a third circular-arc-shaped sidewall and a fourth circular-arc-shaped sidewall being disposed with intervals and the central axes of the third circular-arc-shaped sidewall and the fourth circular-arc-shaped sidewall are on the first rotation axis, and the third circular-arc-shaped sidewall and the fourth circular-arc-shaped sidewall are sliding held between the first circular-arc-shaped sidewall and the second circular-arc-shaped sidewall.

Wherein, the multiple supporting brackets comprise two first supporting brackets in parallel disposition and two second supporting brackets in parallel disposition, and the first supporting brackets and the second supporting brackets are hinged connected in sequence to form a parallelogram frame.

Wherein, the first supporting brackets and the second supporting brackets are hinged connected through the connecting slot at two apex angles of the opposite corners of the parallelogram frame.

Wherein, the first supporting brackets and the second supporting brackets are hinged connected through a connecting member at the other two apex angles of the opposite corners of the parallelogram frame, and the connecting member inserts into through holes of the first supporting bracket and the second supporting bracket to allow the first supporting brackets and the second supporting brackets to rotate relatively about a second rotation axis perpendicular to the plane of the display backplane.

Wherein, intersection points defined by the first rotation axis, the second rotation axis, and the plane of the display backplane form a parallelogram.

Wherein, at four apex angles of the opposite corners of the parallelogram frame, the first supporting brackets and the second supporting brackets are all hinged connected through the connecting slots, and intersection points defined by the first rotation axis and the plane of the display backplane at the four apex angles form a parallelogram.

Wherein, the sliding slot and the protruding platform are formed on the corresponding supporting brackets by stamping.

In order to solve the above-mentioned technical problem, another technical solution provided by the present invention is: an LCD device comprising:

a display backplane, the display backplane comprising multiple supporting brackets and a connecting slot, wherein, the connecting slot comprises a sliding slot disposed at a terminal portion of one of the supporting brackets and a protruding platform disposed at a terminal portion of another of the supporting brackets, wherein the protruding platform is sliding held in the sliding slot, and the protruding platform and the sliding slot are disposed to allow at least two of the supporting brackets to relatively rotate about a first rotation axis perpendicular to the plane of the display backplane, and the protruding platform and the sliding slot are circular arcs, and at least two of the supporting brackets are hinged connected through the connecting slot.

The beneficial effects of the present invention are: comparing with the prior art, the display backplane of the present invention includes multiple supporting brackets, wherein at least two of the brackets are hinged connected through the connecting slot and can relatively rotate about the first rotation axis perpendicular to the plane of the display backplane. After rotation, the display backplane formed by the brackets is smaller in volume such that it can reduce the volume occupied by the packing and shipping during transportation process of the display backplane in order to reduce the packing and shipping cost during transportation process of the display backplane.

DETAILED DESCRIPTION OF THE PREFERRED EMBODIMENT

The following content combines the figures and the embodiments for detail description of the present invention.

Figure 1:
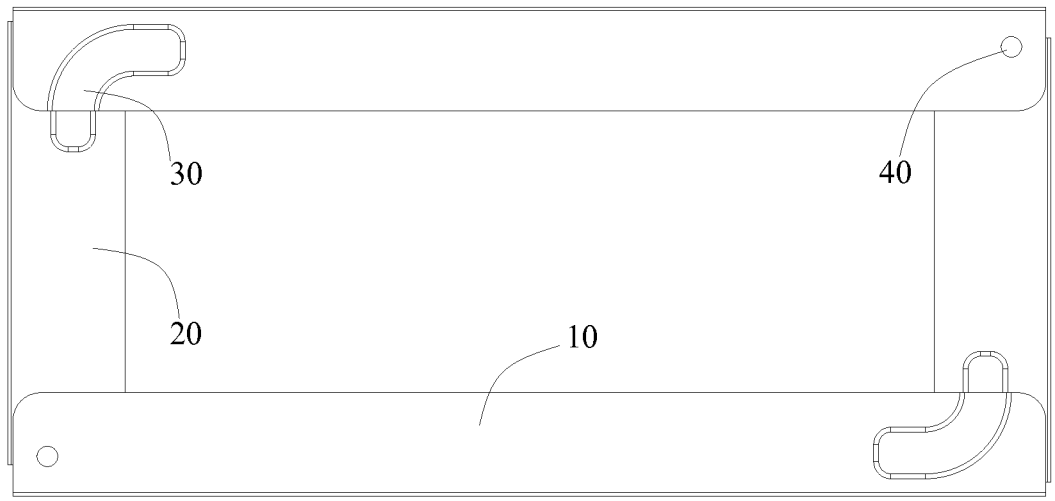
FIG. 1 is a schematic perspective view of an embodiment of the display backplane of the present invention in the assembly state.
Figure 2:
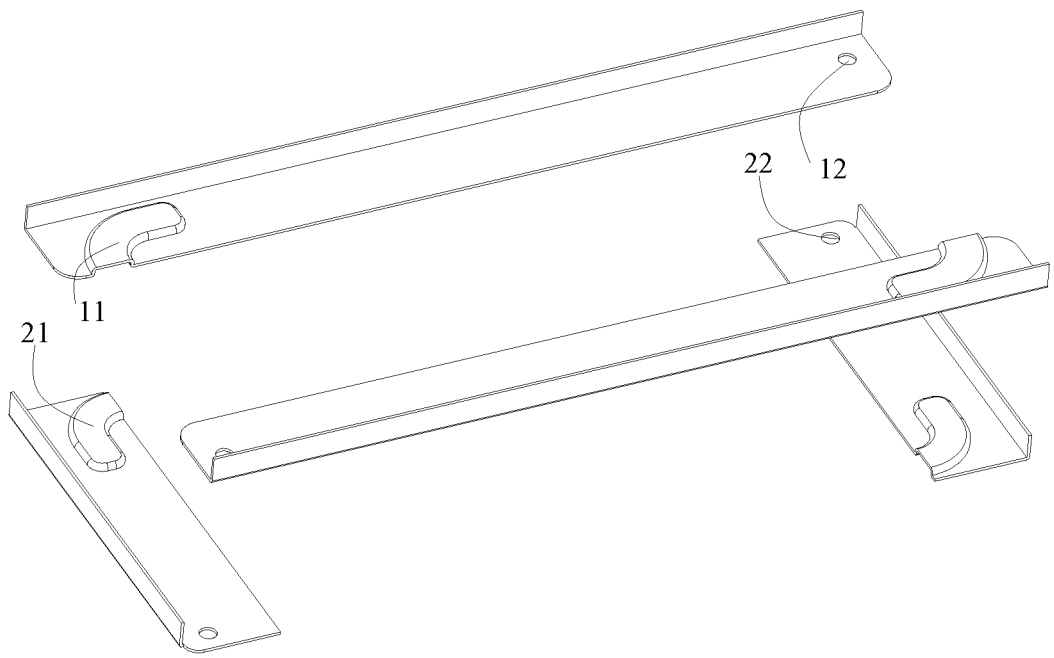
FIG. 2 is a schematic perspective view of the display backplane of the present invention shown in FIG. 1 in the exploded state.

With reference to FIG. 1 and FIG. 2, an embodiment of the present invention provides a display backplane. The display backplane includes two first supporting brackets 10, two second supporting brackets 20, and two connecting parts 40.

In the present embodiment, the two first supporting brackets 10 are parallel to each other, and the two second supporting brackets 20 are parallel to each other. The first supporting brackets 10 and the second supporting brackets 20 are hinged connected in sequence of the first supporting bracket 10—the second supporting bracket 20—the first supporting bracket 10—the second supporting bracket 20 to join the head and tail so as to form a parallelogram frame.

In the present embodiment, at apex angles of the opposite corners of the parallelogram frame, the first supporting bracket 10 and the second supporting bracket 20 are hinged connected through a connecting slot 30. The connecting slot 30 includes a sliding slot 11 and a protruding platform 21. The sliding slot 11 is disposed at a terminal portion of the supporting bracket 10 and is a circular-arc-shaped sliding slot. The protruding platform 21 is disposed at a terminal portion of the supporting bracket 20 and the protruding platform 21 is a circular-arc-shaped platform, the protruding platform 21 is sliding held in the sliding slot 11. The sliding slot 11 and the protruding platform 21 are preferably formed respectively on the first supporting bracket 10 and second supporting bracket 20 by stamping process.

At the other two apex angles of the opposite corners of the parallelogram frame, the first supporting bracket 10 and the second supporting bracket 20 are hinged connected through the connecting member 40. The first bracket 10 has a through hole 12, and a position of the second bracket 20 corresponding to the through hole 12 has a through hole 22. The connecting member 40 is inserted into the through hole 12 and the through hole 22 so as to connect the first supporting bracket 10 and the second supporting bracket 20.

Wherein, the through hole 12 and the sliding slot 11 are disposed with intervals, and the through holes 12 is disposed at the other terminal portion of the bracket 10. The through hole 22 and the protruding platform 21 are disposed with intervals, and the through hole 22 is disposed at the other terminal portion of the bracket 20.

In the present embodiment, the first supporting brackets 10 and the second supporting brackets 20 being hinged connected through the two connecting slot 30 can rotate relatively about a first rotation axis (not shown) which is perpendicular to the plane of the display backplane. The first supporting brackets 10 and the second supporting brackets 20 being hinged connected through the two connecting members 40 can rotate relatively about a second rotation axis (not shown) which is perpendicular to the plane of the display backplane.

In order to ensure the matching effect of the sliding slot 11 and the protruding platform 21, preferably, the sliding slot 11 and the protruding platform 21 are disposed concentrically. Therefore, the rotation center on the first rotation axis is the center of the circle of the sliding slot 11 and the protruding platform 21, and the first rotation axis is perpendicular to the plane of the display backplane.

The connecting member 40 connects the first supporting bracket 10 and the second supporting bracket 20 by using the through holes 12 and 22. Therefore, the through holes 12 and 22 are disposed concentrically. The rotation center on the second rotation axis is the center of the through holes 12 and 22, and the second rotation axis is perpendicular to the plane of the display backplane.

Figure 3:
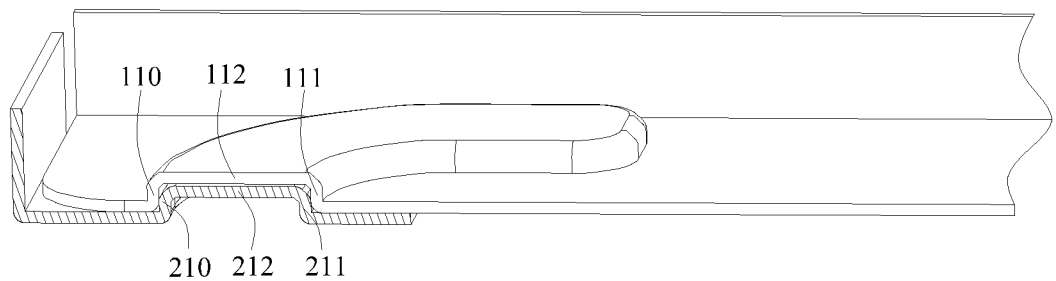
FIG. 3 is a partial schematic view of the connecting slot of the display backplane shown in FIG. 1.

With reference to FIG. 3, specifically, the a circular-arc-shaped sliding slot 11 includes a first circular-arc-shaped sidewall 110 and a second circular-arc-shaped sidewall 111 being disposed with intervals and the central axes of them are on the first rotation axis. The protruding platform 21 includes a third circular-arc-shaped sidewall 210 and a fourth circulararc-shaped sidewall 211 disposed with intervals and the central axis of them are on the first rotation axis. The third circular-arc-shaped sidewall 210 and the fourth circular-arc-shaped sidewall 211 are sliding held between the first circular-arc-shaped sidewall 110 and the second circular-arc-shaped sidewall 111. Furthermore, the circular-arc-shaped sliding slot 11 includes the first circular-arc-shaped sidewall 110, the second circular-arc-shaped sidewall 111, and a first top wall 112. And the protruding platform 21 includes a third circular-arc-shaped sidewall 210, a fourth circular-arc-shaped sidewall 211, and a second top wall 212. The second top wall 212 can slide relatively to the first top wall 112.

By the above description way, the first supporting bracket 10 and the second supporting bracket 20 being hinged connected by the circular-arc-shaped sliding slot 11 and the protruding platform 21 can rotate about the first rotation axis, and the hinged position connected through the connecting slot 30 has a better mechanical strength.

Figure 4:
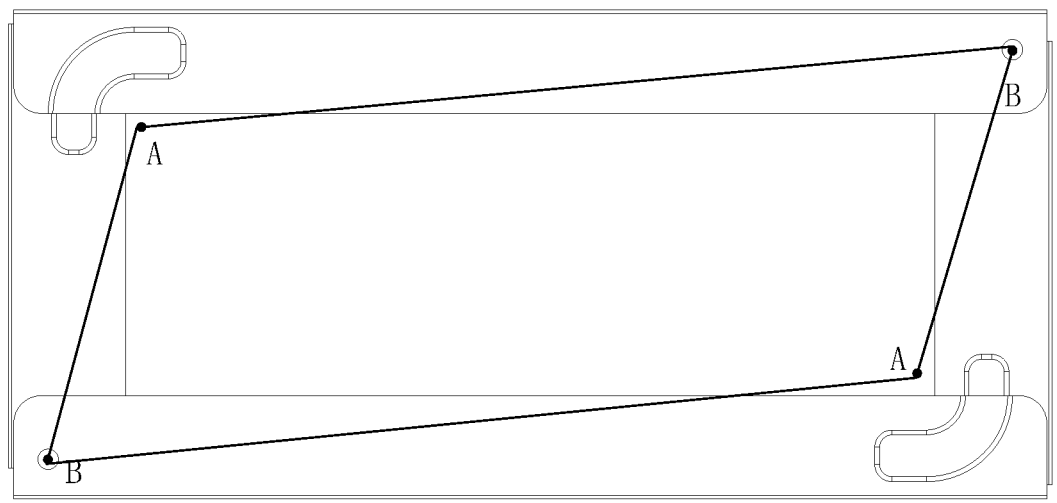
FIG. 4 is a front view of the first rotation axis and the second rotation axis of the display backplane of the present invention.

Please also refer to FIG. 4. In the present embodiment, two intersection points A defined by the first rotation axis and the plane of the display backplane and two intersection points B defined by the second rotation axis and the plane of the display backplane form a parallelogram. Therefore, the first supporting brackets 10 and the second supporting brackets 20 can rotate about the first rotation axis and the second rotation axis, and the volume of the display backplane after rotation is smaller such that it can reduce the volume occupied by the packing and shipping during transportation process of the display backplane in order to reduce the packing and shipping cost during transportation process of the display backplane.

In another embodiment, the first supporting brackets 10 and the second supporting brackets 20 of the parallelogram frame can all being hinged connected through the connecting slots 30, that is, the hinged connection are through four connecting slots 30. And four intersection points A defined by the first rotation axis and the plane of the display backplane form a parallelogram.

The parallelogram frame being hinged connected by the four connecting slots 30 has a higher mechanical strength and can achieve that the four hinged connection positions of the first supporting brackets 10 and the second supporting brackets 20 can respectively rotate about the first rotation axis in order to reduce the volume of the display backplane.

The present invention further provides an LCD device, comprising the display backplane as described above.

The beneficial effects of the present invention are: comparing with the prior art, the display backplane of the present invention includes multiple supporting brackets, wherein at least two of the brackets are hinged connected through the connecting slot and can relatively rotate about the first rotation axis perpendicular to the plane of the display backplane. After rotation, the display backplane formed by the brackets is smaller in volume such that it can reduce the volume occupied by the packing and shipping during transportation process of the display backplane in order to reduce the packing and shipping cost during transportation process of the display backplane.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A display backplane comprising:
   multiple supporting brackets comprising two first supporting brackets in parallel disposition and two second supporting brackets in parallel disposition, wherein the first supporting brackets and the second supporting brackets are hinged connected in sequence to form a parallelogram frame; and
   a connecting slot comprising:
      a sliding slot disposed at a terminal portion of one of the supporting brackets, being circular-arc-shaped and having:
         a first circular-arc-shaped sidewall;
         a second circular-arc-shaped sidewall being disposed with intervals; and
         a first top wall connecting the first circular-arc-shaped sidewall and the second circular-arc-shaped sidewall, wherein, central axes of the first circular-arc-shaped sidewall and the second circular-arc-shaped sidewall are on a first rotation axis;
      a protruding platform disposed at a terminal portion of another of the supporting brackets, being circular-arc-shaped, and the protruding platform having:
         a third circular-arc-shaped sidewall;
         a fourth circular-arc-shaped sidewall being disposed with intervals; and
         a second top wall connecting the third circular-arc-shaped sidewall and fourth circular-arc-shaped sidewall, wherein, the central axes of the third circular-arc-shaped sidewall and the fourth circular-arc-shaped sidewall are on the first rotation axis;
   wherein the protruding platform is sliding and held in the sliding slot, and the protruding platform and the sliding slot are disposed to allow at least two of the supporting brackets to relatively rotate about the first rotation axis perpendicular to the plane of the display backplane, and at least two of the supporting brackets are hinged connected through the connecting slot.

2. The display backplane according to claim 1, wherein, the third circular-arc-shaped sidewall and the fourth circular-arc-shaped sidewall are sliding and held between the first circular-arc-shaped sidewall and the second circular-arc-shaped sidewall.

3. The display backplane according to claim 1, wherein, the first supporting brackets and the second supporting brackets are hinged connected through the connecting slot at two apex angles of the opposite corners of the parallelogram frame.

4. The display backplane according to claim 3, wherein, the first supporting brackets and the second supporting brackets are hinged connected through a connecting member at the other two apex angles of the opposite corners of the parallelogram frame, and the connecting member inserts into through holes of the first supporting bracket and the second supporting bracket to allow the first supporting bracket and the second supporting bracket to rotate relatively about a second rotation axis perpendicular to the plane of the display backplane.

5. The display backplane according to claim 4, wherein, intersection points defined by the first rotation axis, the second rotation axis, and the plane of the display backplane form a parallelogram.

6. The display backplane according to claim 1, wherein, at four apex angles of the opposite corners of the parallelogram frame, the first supporting brackets and the second supporting brackets are all hinged connected through the connecting slots, and the intersection points defined by the first rotation axis and the plane of the display backplane at the four apex angles form a parallelogram.

7. The display backplane according to claim 1, wherein, the sliding slot and the protruding platform are formed on the corresponding supporting brackets by stamping.

8. A display backplane comprising:
multiple supporting brackets; and
a connecting slot comprising:
 a sliding slot disposed at a terminal portion of one of the supporting brackets, being circular-arc-shaped and having:
  a first circular-arc-shaped sidewall;
  a second circular-arc-shaped sidewall being disposed with intervals; and
  a first top wall connecting the first circular-arc-shaped sidewall and the second circular-arc-shaped sidewall, wherein, the central axes of the first circular-arc-shaped sidewall and the second circular-arc-shaped sidewall are on a first rotation axis;
 a protruding platform disposed at a terminal portion of another of the supporting brackets, being circular-arc-shaped, and the protruding platform having:
  a third circular-arc-shaped sidewall;
  a fourth circular-arc-shaped sidewall being disposed with intervals; and
  a second top wall connecting the third circular-arc-shaped sidewall and fourth circular-arc-shaped sidewall, wherein, the central axes of the third circular-arc-shaped sidewall and the fourth circular-arc-shaped sidewall are on the first rotation axis;
 wherein the protruding platform is sliding and held in the sliding slot, and the protruding platform and the sliding slot are disposed to allow at least two of the supporting brackets to relatively rotate about the first rotation axis perpendicular to the plane of the display backplane, and at least two of the supporting brackets are hinged connected through the connecting slot.

9. The display backplane according to claim 8, wherein, the third circular-arc-shaped sidewall and the fourth circular-arc-shaped sidewall are sliding and held between the first circular-arc-shaped sidewall and the second circular-arc-shaped sidewall.

10. The display backplane according to claim 8, wherein, the multiple supporting brackets comprise two first supporting brackets in parallel disposition and two second supporting brackets in parallel disposition, and the first supporting brackets and the second supporting brackets are hinged connected in sequence to form a parallelogram frame.

11. The display backplane according to claim 10, wherein, the first supporting brackets and the second supporting brackets are hinged connected through the connecting slot at two apex angles of the opposite corners of the parallelogram frame.

12. The display backplane according to claim 11, wherein, the first supporting brackets and the second supporting brackets are hinged connected through a connecting member at the other two apex angles of the opposite corners of the parallelogram frame, and the connecting member inserts into through holes of the first supporting bracket and the second supporting bracket to allow the first supporting brackets and the second supporting brackets to rotate relatively about a second rotation axis perpendicular to the plane of the display backplane.

13. The display backplane according to claim 12, wherein, intersection points defined by the first rotation axis, the second rotation axis, and the plane of the display backplane form a parallelogram.

14. The display backplane according to claim 10, wherein, at four apex angles of the opposite corners of the parallelogram frame, the first supporting brackets and the second supporting brackets are all hinged connected through the connecting slots, and intersection points defined by the first rotation axis and the plane of the display backplane at the four apex angles form a parallelogram.

15. The display backplane according to claim 8, wherein, the sliding slot and the protruding platform are formed on the corresponding supporting brackets by stamping.

16. An LCD device comprising:
 a display backplane, the display backplane comprising multiple supporting brackets and a connecting slot, wherein, the connecting slot comprises a sliding slot disposed at a terminal portion of one of the supporting brackets and a protruding platform disposed at a terminal portion of another of the supporting brackets, wherein the protruding platform is sliding and held in the sliding slot, and the protruding platform and the sliding slot are disposed to allow at least two of the supporting brackets to relatively rotate about a first rotation axis perpendicular to the plane of the display backplane, and the protruding platform and the sliding slot are circular arcs, and at least two of the supporting brackets are hinged connected through the connecting slot; wherein,
 the sliding slot having:
  a first circular-arc-shaped sidewall;
  a second circular-arc-shaped sidewall being disposed with intervals; and
  a first top wall connecting the first circular-arc-shaped sidewall and the second circular-arc-shaped sidewall, wherein, the central axes of the first circular-arc-shaped sidewall and the second circular-arc-shaped sidewall are on the first rotation axis;
 the protruding platform having:
  a third circular-arc-shaped sidewall;
  a fourth circular-arc-shaped sidewall being disposed with intervals; and
 a second top wall connecting the third circular-arc-shaped sidewall and fourth circular-arc-shaped sidewall, wherein, the central axes of the third circular-arc-shaped sidewall and the fourth circular-arc-shaped sidewall are on the first rotation axis.

* * * * *